C. A. B. FLENNIKEN.
EDUCATIONAL DEVICE.
APPLICATION FILED NOV. 11, 1916.
1,228,197. Patented May 29, 1917.
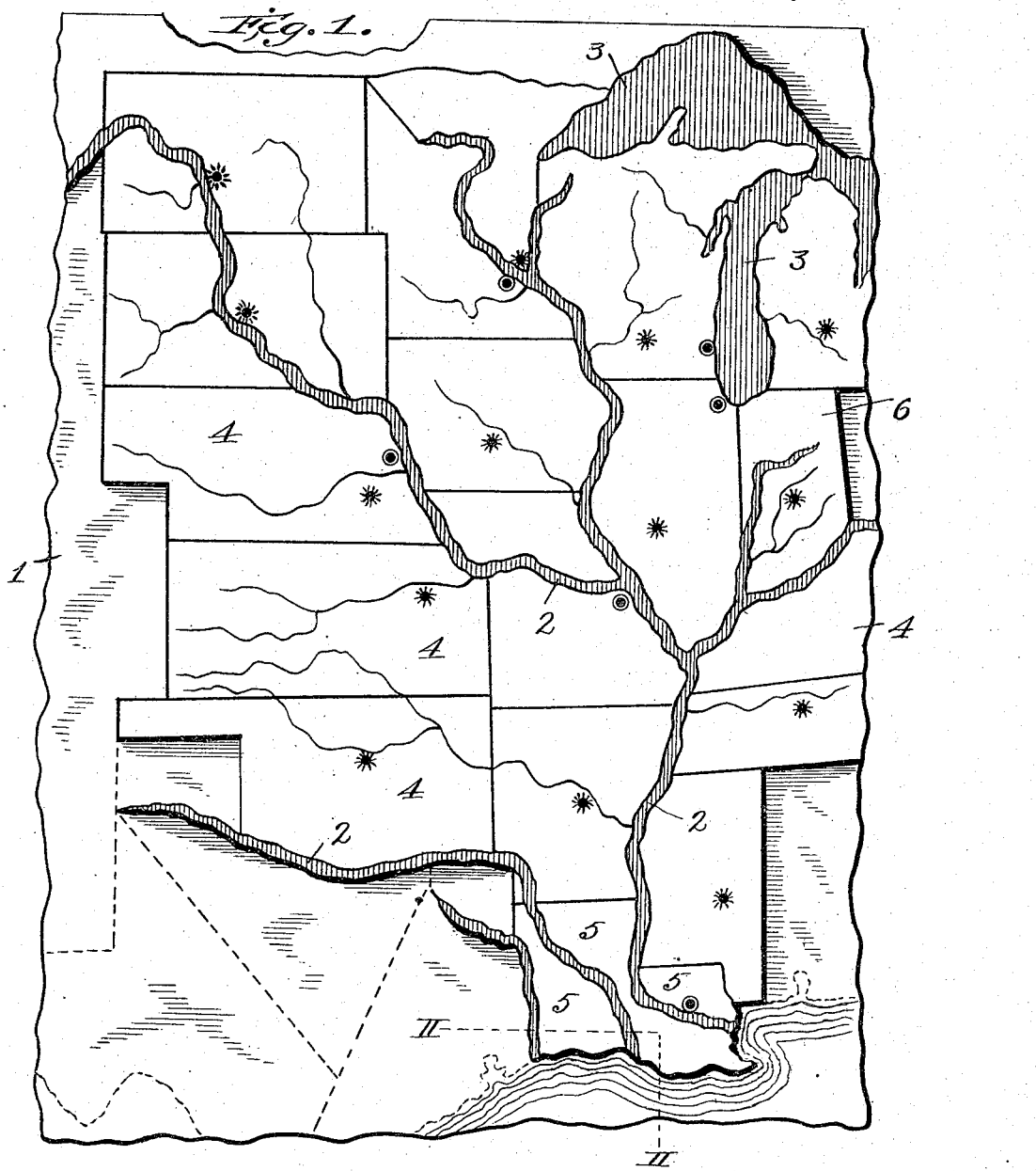
Witness
Edwin L. Jewell
Inventor
Charles A. B. Flenniken
by Percy B. Hills
Attorney

UNITED STATES PATENT OFFICE.

CHARLES A. B. FLENNIKEN, OF WATERTOWN, MASSACHUSETTS.

EDUCATIONAL DEVICE.

1,228,197. Specification of Letters Patent. Patented May 29, 1917.

Application filed November 11, 1916. Serial No. 130,786.

*To all whom it may concern:*

Be it known that I, CHARLES A. B. FLENNIKEN, a citizen of the United States, residing at Watertown, in the county of Middlesex and State of Massachusetts, have invented certain new and useful Improvements in Educational Devices, of which the following is a specification.

My invention relates to educational devices, in which the element of amusement enters, particularly when used by small children, and has for its object to aid in the study of geography, by means of what are known in the art as dissected maps, my present invention embodying certain improvements in this form of map and its base rendering the device more readily capable of use and adding to the enjoyment and instruction afforded in its use.

This object I accomplish in the manner and by the means hereinafter more specifically described and claimed, reference being had to the accompanying drawing, in which:—

Figure 1 is a plan view of a portion of a board embodying my improvement.

Fig. 2 is a detail sectional view taken on the line II—II of Fig. 1.

Similar numerals of reference denote corresponding parts in the two views.

In the said drawing, the reference numeral 1 denotes the base board of my improved device, the same being formed of any suitable material and having indicated thereon in outline a map, such for instance as a map of the United States of America, and showing the coast outline by conventional shade lines, which part may be in contrasting color, such as blue, if desired.

In order to afford a better guide for the user in assembling the map, I have provided thereon in raised portions the main rivers of the country, indicated at 2, in this instance the United States of America, as well as the Great Lakes, indicated at 3. I also provide blocks 4 shaped to denote the different States, and where necessary making up these States of a plurality of blocks, such as in the State of Louisiana where three separate blocks 5 are employed, this being necessary because of the fact that two rivers, indicated in raised outline, cut through this State. In case a river penetrates a State but does not extend all the way across it in raised outline, the block may be cut away to fit the outline of the river, as shown at 6 with respect to the State of Indiana. At the lower left hand portion of Fig. 1, a greater portion of the State of Texas is shown, the same being crossed by the raised outline of the Red River, which separates said State in part from the State of Oklahoma, thus necessitating that the State of Texas be designated by at least two blocks. Or it may be preferred, on account of the size of said State, that it be made up of a still greater number of blocks, as for instance, by five blocks, which are outlined by the dotted lines on the space to be covered by said State.

It readily will be understood that by providing the base board with the main rivers and the Great Lakes in raised outline, the same afford a desirable guide for the user in assembling the blocks designating the various States, and not only aid materially in this manner, but also call particular attention to said main rivers and lakes and impress more perfectly upon the mind their line of flow and location with respect to the States than would occur otherwise.

While I have shown the Great Lakes, in this instance, as in raised outline, it will be understood that this is not an essential feature as said lakes may be indicated as the oceans are indicated, the essential feature of the invention being the indication of the larger rivers of the country in raised outline, thereby acting not only as a guide in assembling the blocks, but also as a means of instruction as to said rivers.

Having thus described my invention, what I claim as new and desire to secure by Letters Patent, is:

1. An educational device, comprising a base board having a map indicated thereon in outline, raised portions on said base board indicating water, and blocks designating subdivisions of said map and shaped to interfit with each other and with said raised portions.

2. An educational device, comprising a base board having a map indicated thereon in outline, raised portions on said base board indicating rivers, and blocks designating subdivisions of said map and shaped to interfit with each other and with said raised portions, whereby the rivers when the map is assembled will be indicated separately.

In testimony whereof, I hereunto set my hand this 9th day of November, 1916.

CHARLES A. B. FLENNIKEN.

Copies of this patent may be obtained for five cents each, by addressing the "Commissioner of Patents, Washington, D. C."